Figure 1:
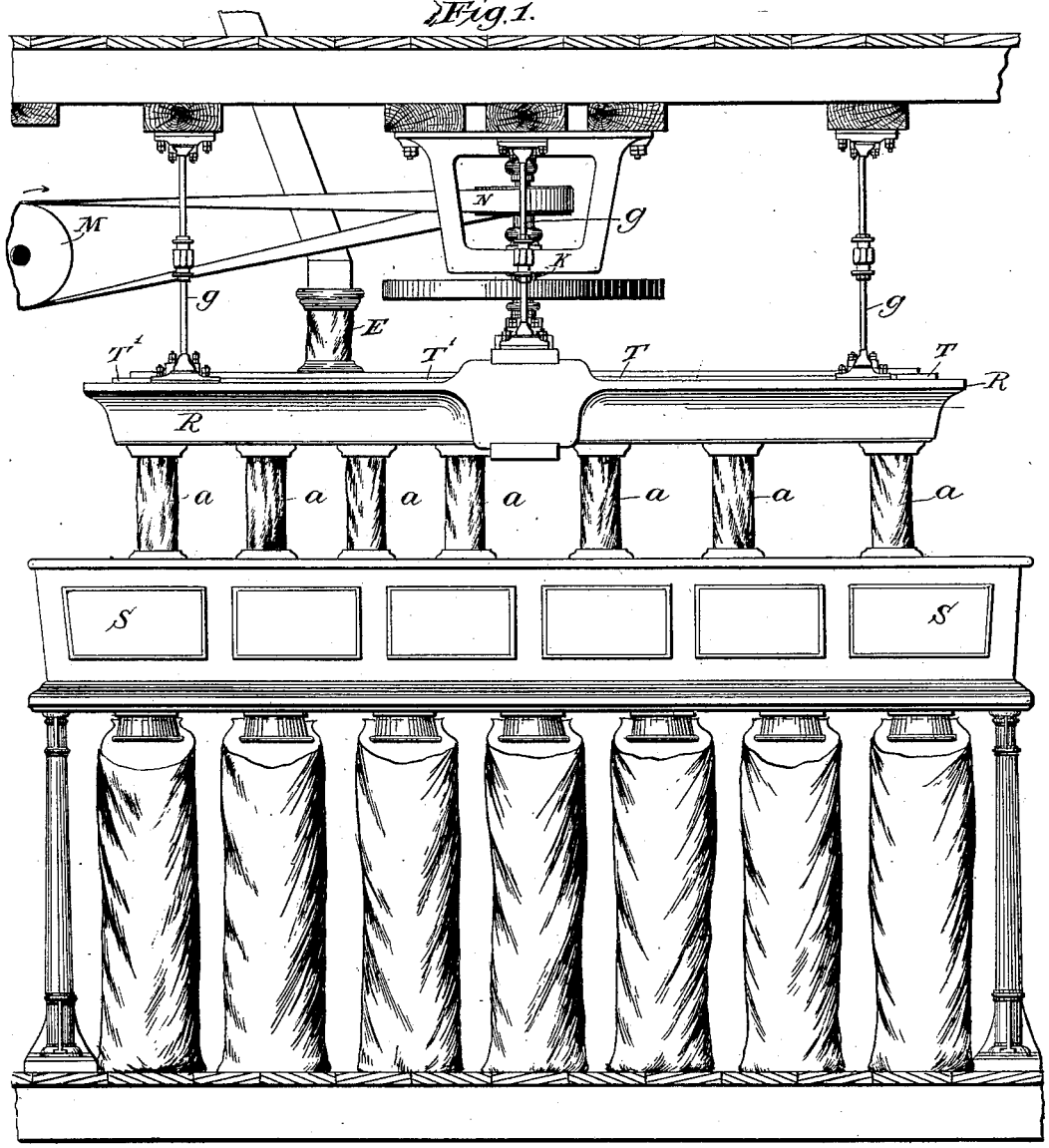
Figure 10:
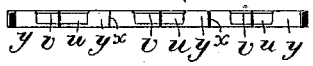
Figure 11:
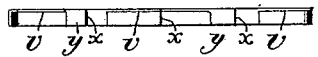

(No Model.) 21 Sheets—Sheet 1.

C. HAGGENMACHER.
APPARATUS FOR SIFTING AND SORTING MEAL, FLOUR, &c.

No. 428,907. Patented May 27, 1890.

Witnesses:
Wm. A. Schomborn
C. W. H. Brown

Inventor:
Carl Haggenmacher
by Herbert W. T. Jenner
Attorney.

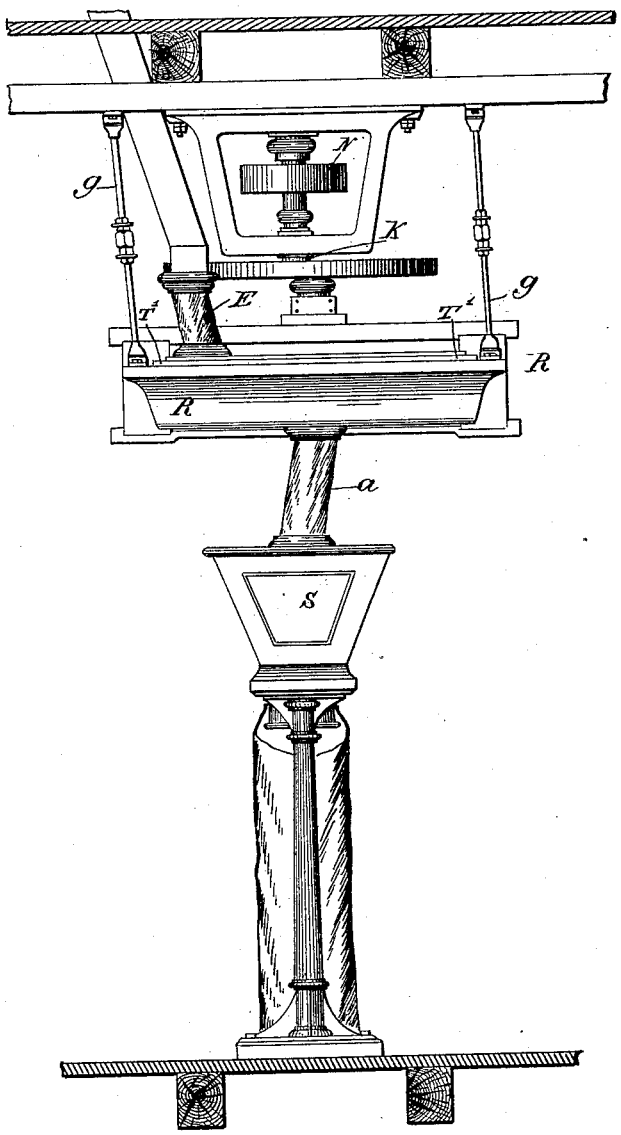

(No Model.) 21 Sheets—Sheet 3.
C. HAGGENMACHER.
APPARATUS FOR SIFTING AND SORTING MEAL, FLOUR, &c.
No. 428,907. Patented May 27, 1890.
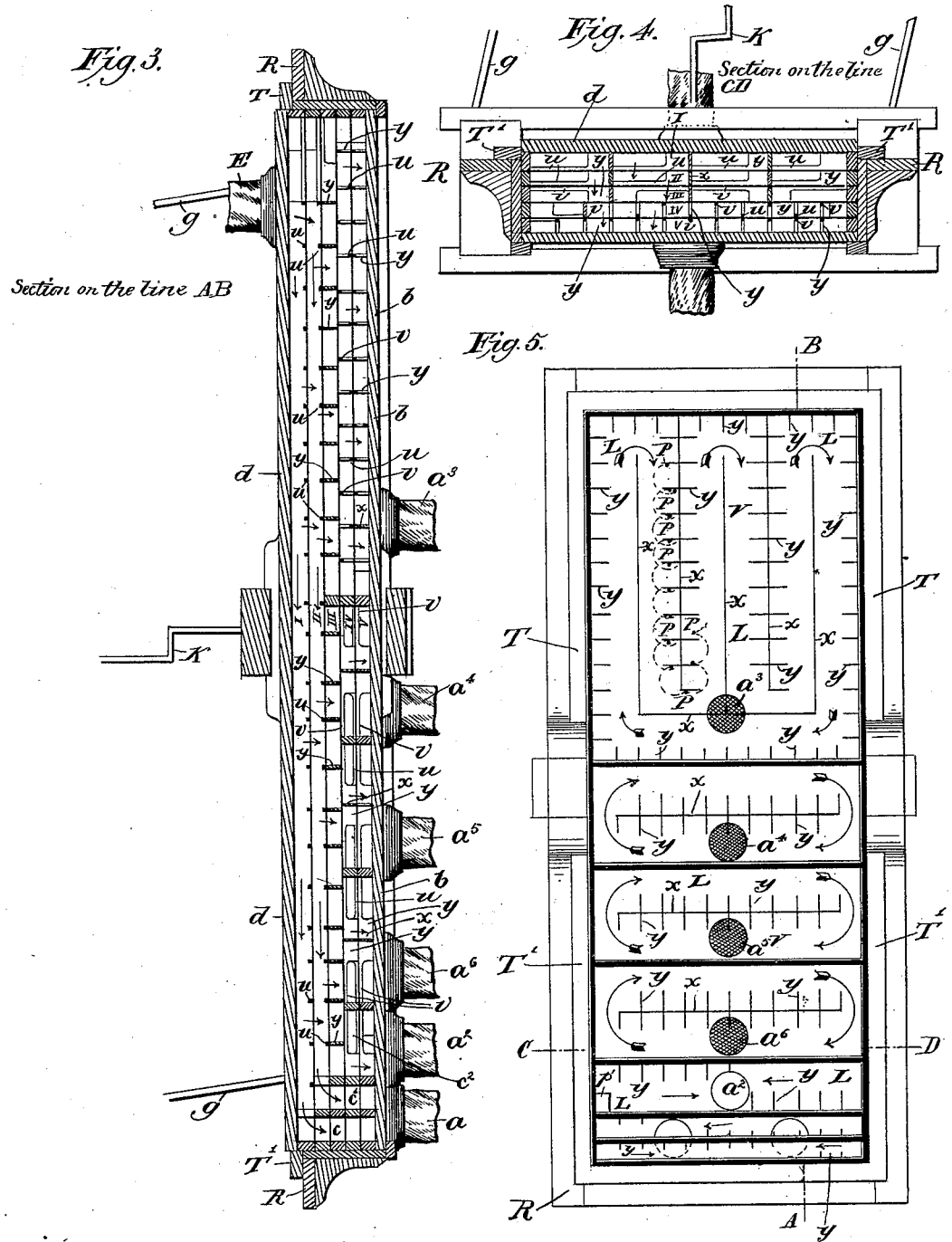

(No Model.) 21 Sheets—Sheet 4.

C. HAGGENMACHER.
APPARATUS FOR SIFTING AND SORTING MEAL, FLOUR, &c.

No. 428,907. Patented May 27, 1890.

Witnesses:
Wm. A. Schönborn.
C. W. H. Brown.

Inventor:
Carl Haggenmacher
by Herbert W. T. Jenner
Attorney.

(No Model.)

C. HAGGENMACHER.
APPARATUS FOR SIFTING AND SORTING MEAL, FLOUR, &c.

No. 428,907.  Patented May 27, 1890.

21 Sheets—Sheet 5.

Witnesses:
Wm A. Schrenkorn.
C. W. H. Brown.

Inventor:
Carl Haggenmacher,
by Herbert W. T. Jenner,
Attorney.

(No Model.) 21 Sheets—Sheet 6.
C. HAGGENMACHER.
APPARATUS FOR SIFTING AND SORTING MEAL, FLOUR, &c.
No. 428,907. Patented May 27, 1890.
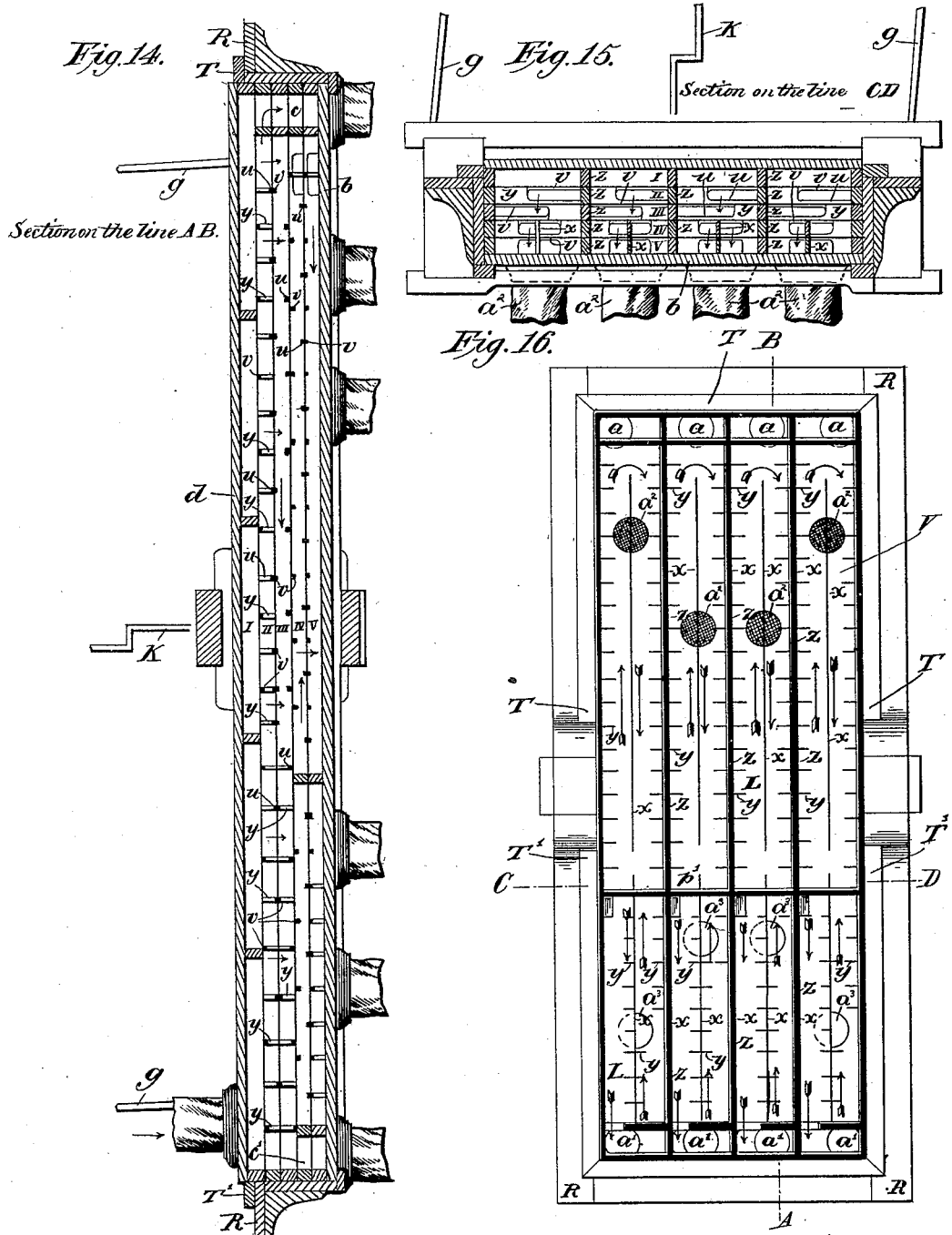

(No Model.)  21 Sheets—Sheet 7.

C. HAGGENMACHER.
APPARATUS FOR SIFTING AND SORTING MEAL, FLOUR, &c.

No. 428,907.  Patented May 27, 1890.

Witnesses:
Wm. A. Schoenborn.
C. W. H. Brown.

Inventor:
Carl Haggenmacher.
by Herbert W. T. Jenner.
Attorney.

(No Model.) 21 Sheets—Sheet 8.
C. HAGGENMACHER.
APPARATUS FOR SIFTING AND SORTING MEAL, FLOUR, &c.
No. 428,907. Patented May 27, 1890.

Witnesses:
Wm A. Schoonborn,
C. W. H. Brown.

Inventor.
Carl Haggenmacher
by Herbert W. Jenner.
Attorney.

(No Model.) 21 Sheets—Sheet 9.
C. HAGGENMACHER.
APPARATUS FOR SIFTING AND SORTING MEAL, FLOUR, &c.
No. 428,907. Patented May 27, 1890.
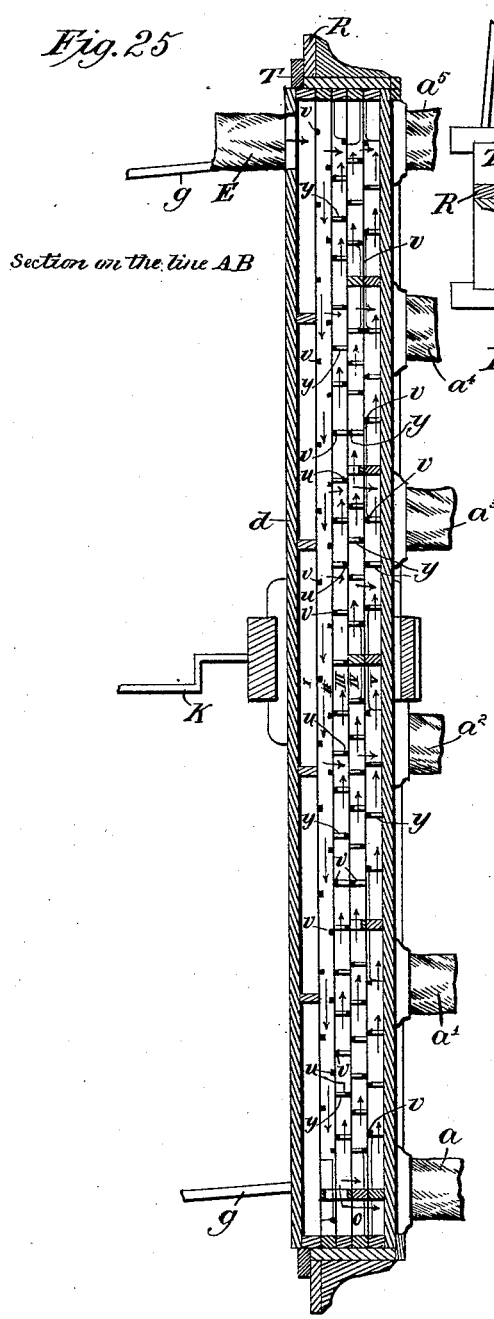
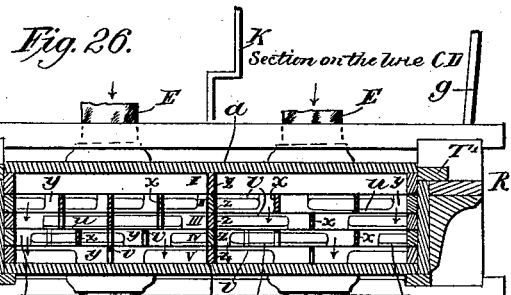
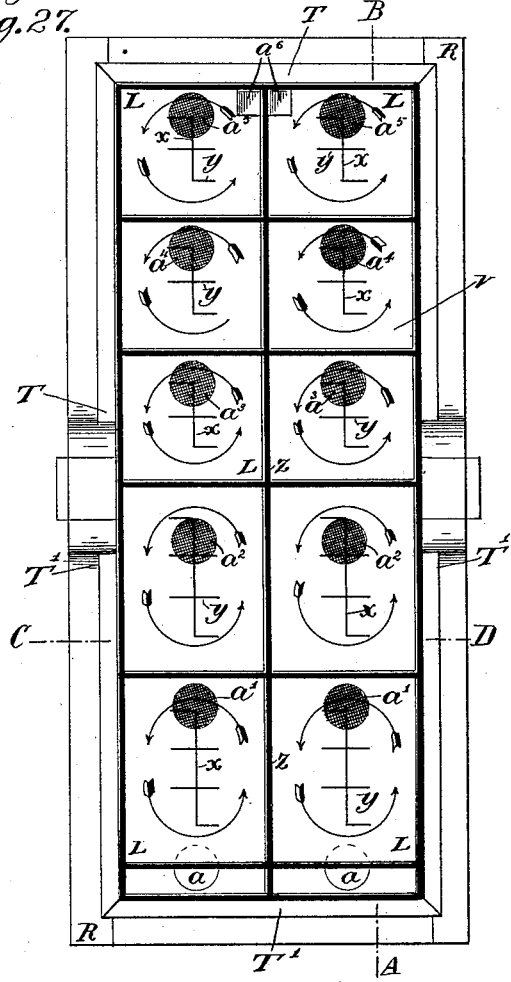
Witnesses:
Wm. A. Schoenborn.
C. H. H. Brown.
Inventor:
Carl Haggenmacher
by Herbert W. T. Jenner
Attorney.

(No Model.) 21 Sheets—Sheet 10.
C. HAGGENMACHER.
APPARATUS FOR SIFTING AND SORTING MEAL, FLOUR, &c.

No. 428,907. Patented May 27, 1890.

Witnesses:
Wm A. Schrenborn.
C. W. H. Brown.

Inventor:
Carl Haggenmacher
by Herbert W. T. Jenner.
Attorney.

(No Model.) 21 Sheets—Sheet 11.
C. HAGGENMACHER.
APPARATUS FOR SIFTING AND SORTING MEAL, FLOUR, &c.
No. 428,907. Patented May 27, 1890.

Witnesses:
Wm. A. Schoenborn.
J. W. H. Brown.

Inventor
Carl Haggenmacher.
by Herbert W. T. Jenner.
Attorney.

(No Model.) 21 Sheets—Sheet 12.
C. HAGGENMACHER.
APPARATUS FOR SIFTING AND SORTING MEAL, FLOUR, &c.
No. 428,907. Patented May 27, 1890.
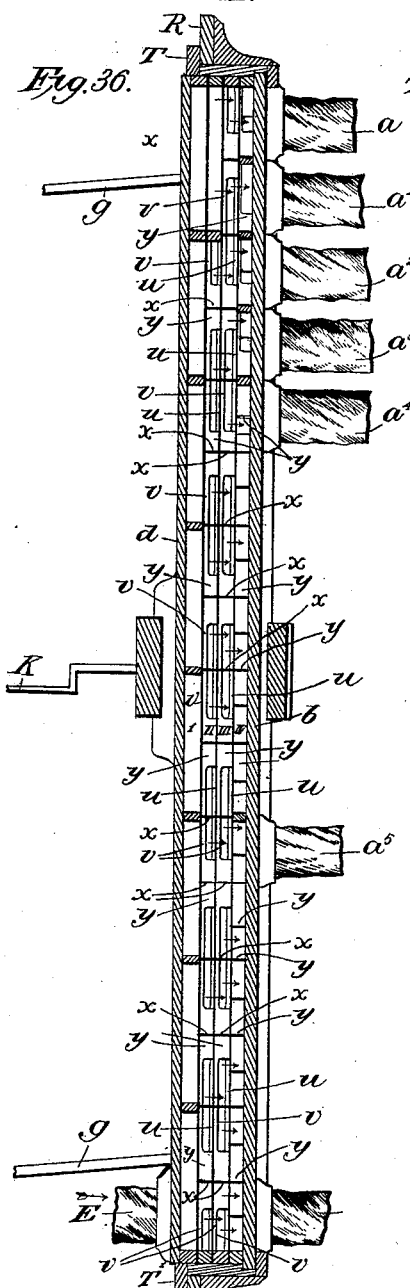
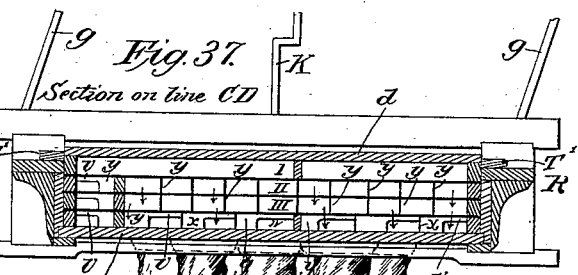
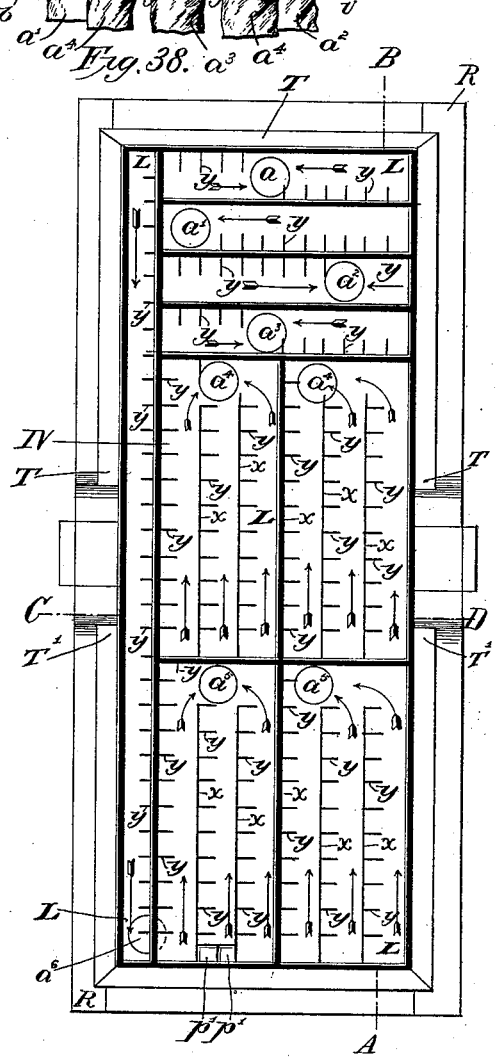
Witnesses:
Wm A Schaenborn
C. W. H. Brown
Inventor:
Carl Haggenmacher
by Herbert W. T. Jenner
Attorney.

(No Model.)  21 Sheets—Sheet 13.
C. HAGGENMACHER.
APPARATUS FOR SIFTING AND SORTING MEAL, FLOUR, &c.

No. 428,907. Patented May 27, 1890.

Witnesses
Wm. A. Schoenborn.
C. H. H. Brown.

Inventor:
Carl Haggenmacher.
by Herbert W. T. Jenner.
Attorney.

(No Model.) 21 Sheets—Sheet 14.

C. HAGGENMACHER.
APPARATUS FOR SIFTING AND SORTING MEAL, FLOUR, &c.

No. 428,907. Patented May 27, 1890.

Witnesses:
Wm A. Schoenborn.
C. W. H. Brown.

Inventor:
Carl Haggenmacher
by Herbert W. Jenner.
Attorney.

(No Model.) 21 Sheets—Sheet 15.
C. HAGGENMACHER.
APPARATUS FOR SIFTING AND SORTING MEAL, FLOUR, &c.
No. 428,907. Patented May 27, 1890.
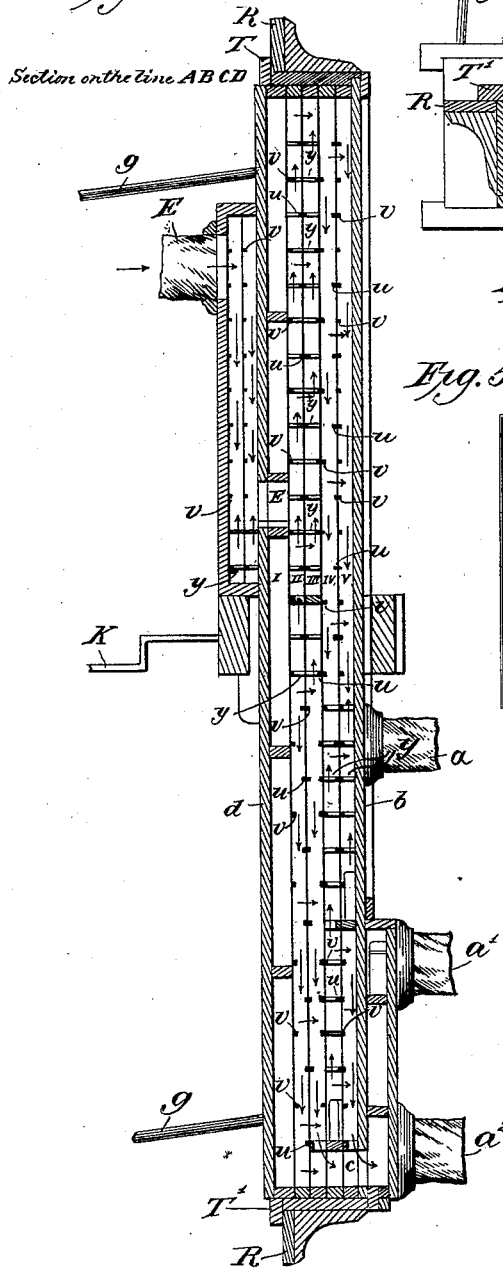
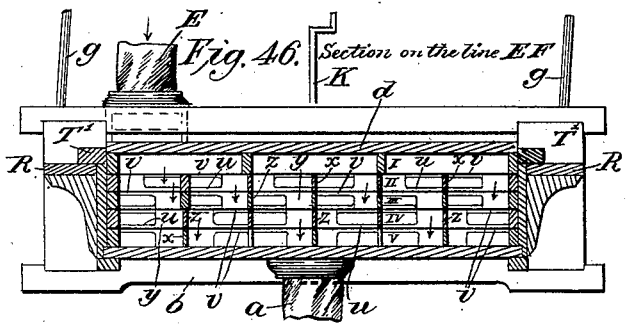
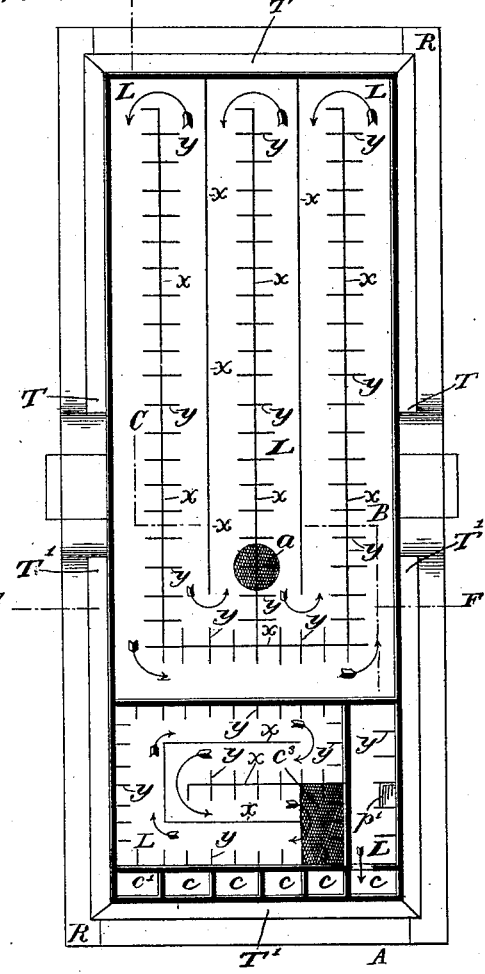
Witnesses:
Wm. A. Schoenborn
C. W. H. Brown
Inventor:
Carl Haggenmacher
by Herbert W. T. Jenner
Attorney (No Model.) 21 Sheets—Sheet 16.
C. HAGGENMACHER.
APPARATUS FOR SIFTING AND SORTING MEAL, FLOUR, &c.

No. 428,907. Patented May 27, 1890.

Witnesses:
Wm. A. Schoenborn.
S. W. H. Brown.

Inventor:
Carl Haggenmacher
by Herbert W. T. Jenner
Attorney.

(No Model.) 21 Sheets—Sheet 17.
C. HAGGENMACHER.
APPARATUS FOR SIFTING AND SORTING MEAL, FLOUR, &c.
No. 428,907. Patented May 27, 1890.
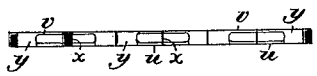
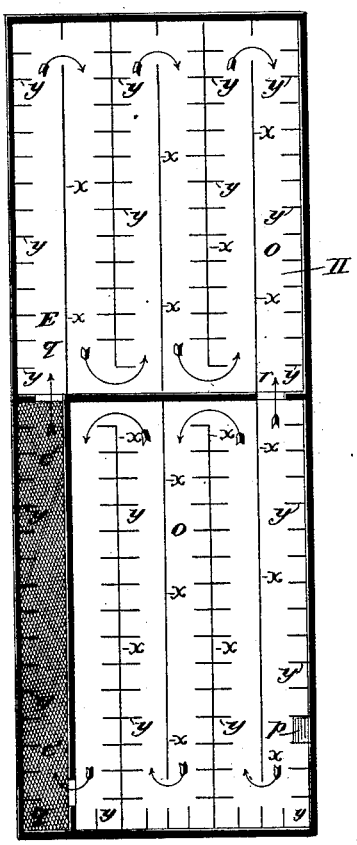
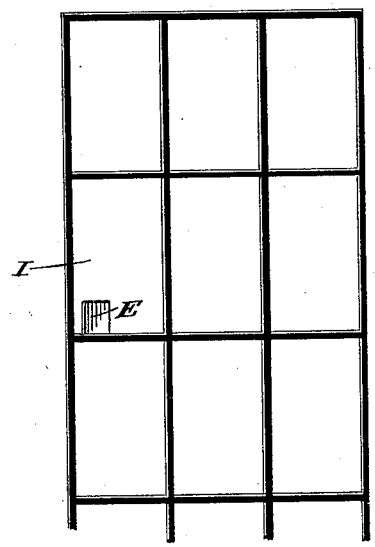
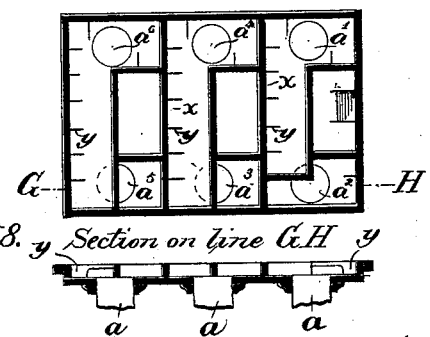
Witnesses:
Wm A. Schoenborn.
B. W. H. Brown.
Inventor:
Carl Haggenmacher.
by Herbert W. Jenner.
Attorney.

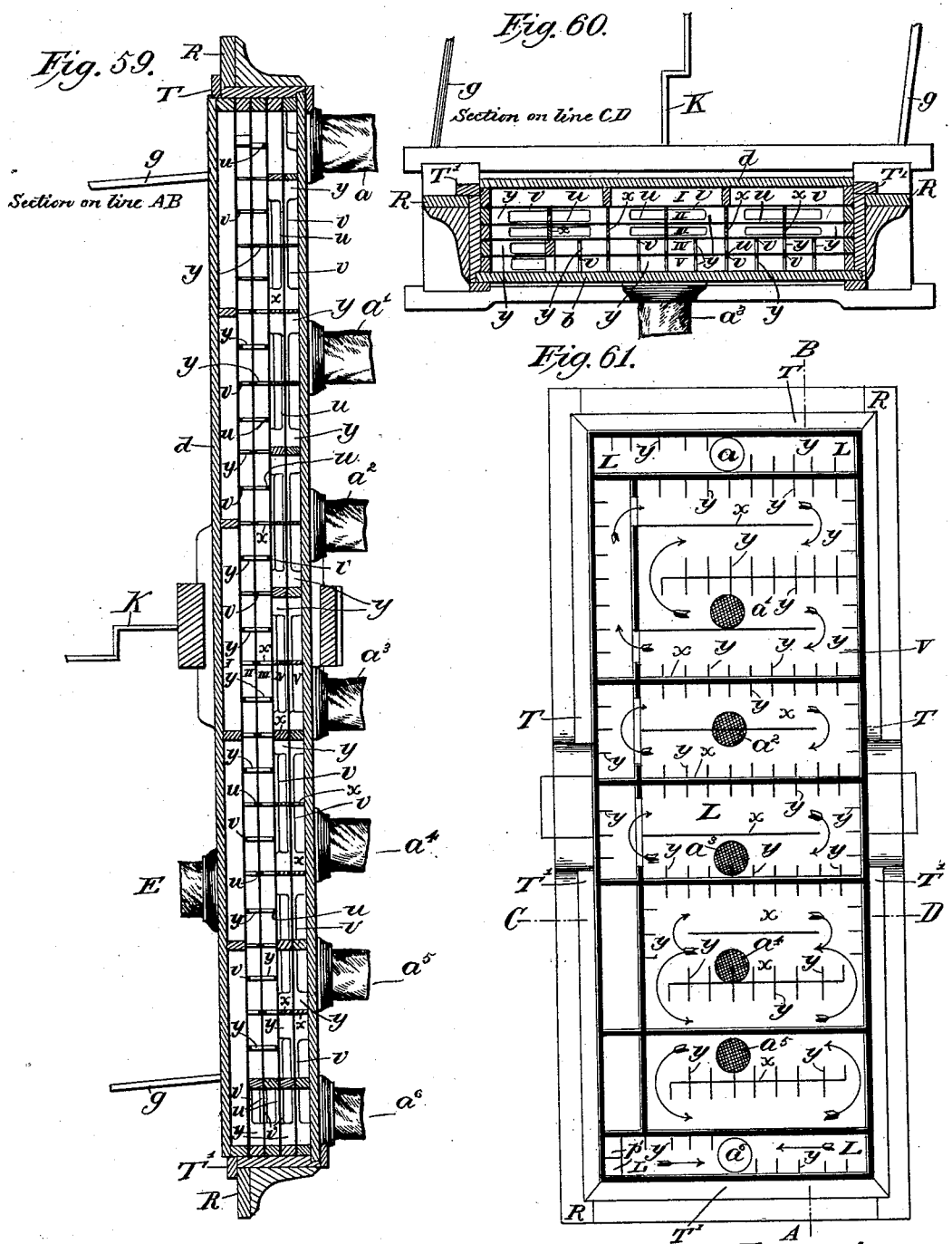

(No Model.) 21 Sheets—Sheet 19.
C. HAGGENMACHER.
APPARATUS FOR SIFTING AND SORTING MEAL, FLOUR, &c.

No. 428,907. Patented May 27, 1890.

Witnesses:
Wm A. Schoenborn.
S. W. H. Brown.

Inventor:
Carl Haggenmacher
by Herbert W. T. Jenner.
Attorney.

(No Model.)  
C. HAGGENMACHER.  
APPARATUS FOR SIFTING AND SORTING MEAL, FLOUR, &c.

No. 428,907.  Patented May 27, 1890.

Witnesses:  
Wm. A. Schoenborn.  
C. W. H. Brown.

Inventor:  
Carl Haggenmacher  
by Herbert W. Jenner  
Attorney.

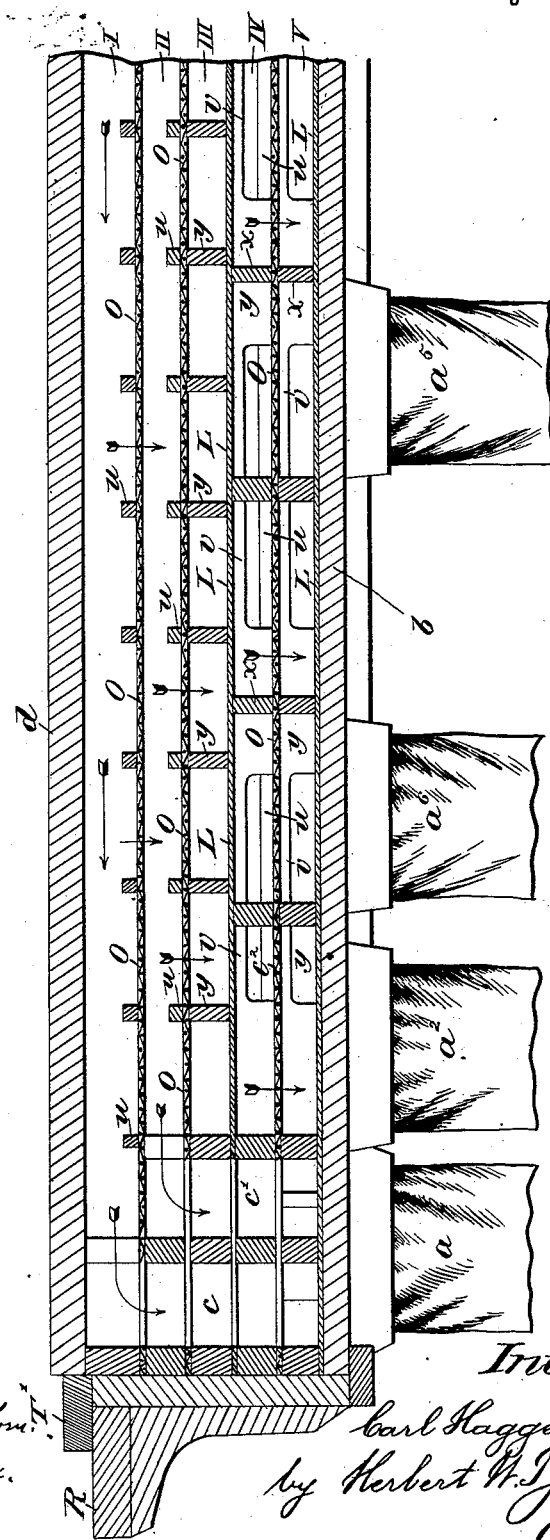

UNITED STATES PATENT OFFICE.

CARL HAGGENMACHER, OF BUDA-PESTH, AUSTRIA-HUNGARY.

APPARATUS FOR SIFTING AND SORTING MEAL, FLOUR, &c.

SPECIFICATION forming part of Letters Patent No. 428,907, dated May 27, 1890.

Application filed September 29, 1888. Serial No. 286,743. (No model.) Patented in France March 30, 1887, No. 182,555; in Germany May 27, 1887, No. 46,509; in Belgium June 27, 1887, No. 77,970, August 31, 1887, No. 78,584, and June 4, 1888, No. 82,038; in England August 2, 1887, Nos. 10,644 and 10,645, and June 11, 1888, No. 8,558; in Austria-Hungary September 20, 1887, No. 27,099 and No. 27,241, and October 12, 1887, No. 31,782 and No. 26,252; in Italy September 30, 1887, XXI, 22,035, and XLIV, 91, and XXI, 22,428, and XLIV, 212, and June 30, 1888, XXII, 23,634, and XLVI, 405; in Luxemburg November 24, 1887, Nos. 921 and 922, and June 5, 1888, No. 998; in Spain December 20, 1887, No. 11,803, March 15, 1888, No. 12,146, and June 12, 1888, No. 8,370; in Norway April 13, 1888, No. 953; in Sweden April 16, 1888, No. 1,792; in Portugal September 20, 1888, No. 1,288; in Brazil September 28, 1888, No. 625; in India October 22, 1888, No. 91; in South Australia October 24, 1888, No. 1,128; in Victoria October 27, 1888, No. 6,293; in New South Wales October 27, 1888, No. 1,037; in Tasmania November 1, 1888, No. 624/10; in Cape of Good Hope November 15, 1888, No. 485; in Switzerland December 1, 1888, No. 149; in Argentine Republic January 10, 1889, No. 722, and in West Australia April 17, 1889, No. 184.

*To all whom it may concern:*

Be it known that I, CARL HAGGENMACHER, a resident of the city of Buda-Pesth, in the Kingdom of Austria-Hungary, and a citizen of the Swiss Republic, have invented certain new and useful Improvements in Apparatus for Sifting and Sorting Meal and Flour; and I do hereby declare the following to be a full, clear, and exact description of the invention, such as will enable others skilled in the art to which it appertains to make and use the same.

Letters Patent have been obtained for this invention, as follows: in Germany, No. 46,509, dated May 27, 1887, and No. 46,985, dated May 27, 1887; in Belgium, No. 82,038, dated June 4, 1888; in France, No. 182,555, dated June 7, 1888; in Spain, No. 8,370, dated June 12, 1888; in Luxemburg, No. 998, dated June 5, 1888; in Italy, Vols. XXII and XLVI, Nos. 23,634 and 405, dated June 30, 1888; in Great Britain, No. 8,558, dated June 11, 1888; in Argentine Republic, No. 722, dated January 10, 1889; in Brazil, No. 625, dated September 28, 1888; in British India, No. 91, dated October 22, 1888; in Victoria, No. 6,293, dated October 27, 1888; in Tasmania, No. 624/10, dated November 1, 1888; in New South Wales, No. 1,037, dated October 27, 1888; in West Australia, No. 184, dated April 17, 1889; in South Australia, No. 1,128, dated October 24, 1888; in Cape of Good Hope, No. 485, dated November 15, 1888; in Portugal, No. 1,288, dated September 20, 1888; in Switzerland, No. 149, dated December 1, 1888; in France, No. 182,555, dated March 30, 1887; in Spain, No. 12,146, dated March 15, 1888; in Norway, No. 953, dated April 13, 1888; in Sweden, No. 1,792, dated April 16, 1888; in Belgium, No. 77,970, dated June 27, 1887, and No. 78,584, dated August 31, 1887; in Great Britain No. 10,644, dated August 2, 1887, and No. 10,645, dated August 2, 1887; in Austria-Hungary, No. 27,099 and No. 27,241, dated September 20, 1887, and No. 31,782 and No. 26,252, dated October 12, 1887; in Italy, Vols. XXI and XLIV, Nos. 22,035 and 91, dated September 30, 1887, and Vols. XXI and XLIV, Nos. 22,428 and 212, dated September 30, 1887; in Luxemburg, No. 921, dated November 24, 1887, and No. 922, dated November 24, 1887; and in Spain No. 11,803, dated December 20, 1887.

This invention relates to machines for sifting and sorting meal and flour; and it consists in the novel construction and combination of the parts, as hereinafter fully described and claimed.

In the drawings, Figure 1 is a front view of the complete machine. Fig. 2 is a side view of the same. Fig. 3 is a longitudinal section through the frame-box R; and Figs. 4 and 5 are respectively a cross-section and a plan view of same, partly in section. Figs. 6 to 13, inclusive, are detail plans and cross-sections of the frames in box R, as shown in Fig. 3. Fig. 14 is a longitudinal section through the frame-box R, showing a modification in the frames. Figs. 15 and 16 are respectively a cross-section and a plan view of same, partly in section. Figs. 17 to 24, inclusive, are detail plans and cross-sections of the frames in box R, as shown in Fig. 14. Fig. 25 is a longitudinal section through the frame-box R, showing a second modification in the frames. Figs. 26 and 27 are respectively a cross-section and a plan view of same, partly in section. Figs. 28 to 35, inclusive, are detail plans and cross-sections of the frames in box R, as shown in Fig. 25. Fig. 36 is a longitudinal section through the frame-box R, showing a third modification in the frames. Figs. 37 and 38 are respectively a cross-section and a plan view of same, partly in section. Figs. 39 to 44, inclusive, are detail plans and cross-sections of the frames in box R, as shown in Fig. 36. Fig. 45 is a longitudinal section through the frame-box R, showing a fourth modification in the frames. Figs. 46 and 47 are respectively a cross-section and a plan view of same, partly in section. Figs. 48 to 55, inclusive, are detail plans and cross-sections of the frames in box R, as shown in Fig. 45. Fig. 56 is a sectional plan of the inlet-chamber shown in Fig. 45. Fig. 57 is a sectional plan, and Fig. 58 is a cross-section through the outlet-chamber shown in Fig. 45. Fig. 59 is a longitudinal section through the frame-box R, showing a fifth modification in the frames. Figs. 60 and 61 are respectively a cross-section and a plan view of same, partly in section. Figs. 62 to 69, inclusive, are detail plans and cross-sections of the frames in box R, as shown in Fig. 59. Fig. 70 is a portion of Fig. 3 drawn to larger scale.

Referring to Figs. 1 and 2, R is a box containing sifting and collecting frames, which will hereinafter be more fully described. The box R is pivotally suspended from a stationary support by the four rods $g$, and has a horizontal circular oscillating or gyrating motion imparted to it by means of the crank or eccentric K. M is a revolving pulley, and N is a belt for operating the crank K, and all these parts for imparting motion to box R may be variously modified and arranged above or below said box, or in any other convenient position relative to said box, so that it may receive the peculiar motion requisite to its action. The material to be operated on passes into the upper part of box R through the hopper E, and is discharged from said box through the channels $a$ into a suitable receptacle S, whence it is distributed into sacks placed beneath said receptacle.

The internal construction of box R is shown in the detail figures. Fig. 3 is a longitudinal section on line A B in Fig. 5. Fig. 4 is a section on line C D in Fig. 5. Fig. 5 is a plan of box R with the cover removed, and shows frame V at the bottom in horizontal section. Figs. 6, 7, 8, and 9 are respectively horizontal sections through the superposed frames IV, III, II, and I; and Figs. 10, 11, 12, and 13 are respectively cross-sections through the said frames.

The frames I II III IV V rest superposed upon the bottom $b$ of the box R, and are inclosed by the sides T T' and lid $d$, secured together by any approved means. Each frame is provided with longitudinal guide-slats $x$ in line with the main direction of travel of the material and with cross-slats $y$ at right angles to slats $x$.

For the purpose of turning over the material every alternate slat $y$ has a low ridge $u$ extending from the end of it to the opposite slat $x$, or to the box side. These ridges are of a height about equal to the depth of the material operated on, and are not shown in Figs. 5 to 9 to avoid confusion. Between every two ridges $u$ the tops of the intervening slats $y$ are extended to the opposite slat $x$, or to the box side, forming bridges $v$ and leaving a passage for the material under said bridges. These bridges strengthen the frames to which they are attached and support the frames above them.

The sifting-surfaces O, stretched under the frames, consist of perforated metal or woven wire or silk fabric, while the collecting-surfaces L consist of linen or other similar close-woven or imperforate material. These surfaces are all fastened to the lower edges of their respective frames.

The traveling action of the slats $y$ upon the material is illustrated in Fig. 5. P are particles of material, which are caused to move in the paths of the dotted semicircles by the circular oscillations of the surface on which they rest, the direction of their travel being determined by the side upon which the slats $y$ are placed. These particles would move in circular paths; but as soon as they have performed the first halves of their circular journeys they meet the slats $y$, which arrest their motion during the time they would be passing over the second halves of the circles, and only permit them to resume their journeys in the forward direction, as indicated by the arrows. By placing the slats $y$ in appropriate positions the particles can be caused to travel in any desired direction.

The irregular shape and size of the particles, their friction against each other and against the sides and slats, and many other circumstances all tend to modify the theoretical semicircular paths in which they should travel; but what is true of a single particle is also true with regard to the aggregate action of an immense number of particles when the surfaces over which they are caused to travel are sufficiently numerous and the slats are arranged in a sufficiently complex manner to meet all requirements. The ridges $u$ turn over the material, and the bridges $v$ even it upon the surface of the sifters or collectors. Every particle is in turn brought in contact with some portion of the sifting-surface, and the collecting-surfaces L are for the purpose of conducting the material to certain desired parts of the remaining sifting-surfaces beneath them.

The longitudinal slats $x$ keep the streams of material traveling in definite paths, and the arrangements of slats $x$ and $y$ may be varied to an almost unlimited extent to adapt the machine to different sorts of material. The sifting-surfaces may also be combined with the collecting or conveying surfaces in many different ways.

The sifting-frames may be provided with plain sieves of equal-sized mesh all over or with sorting-sieves having different-sized meshes at different parts of the same frame.

Figure 9:
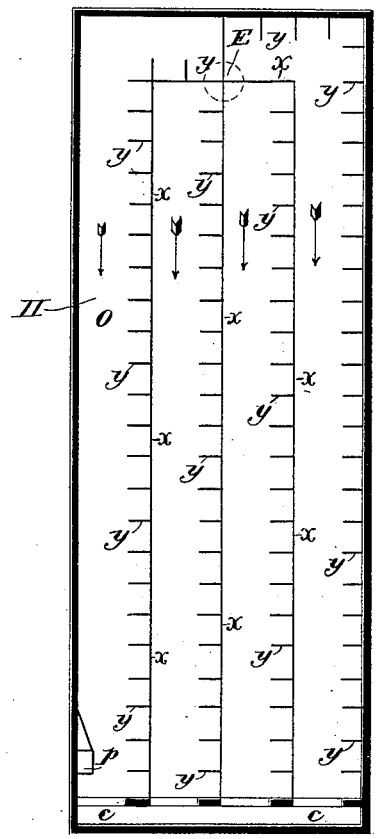
Figure 21:
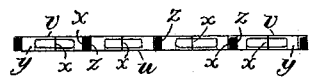
Figure 22:
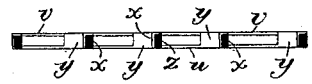
Figure 17:
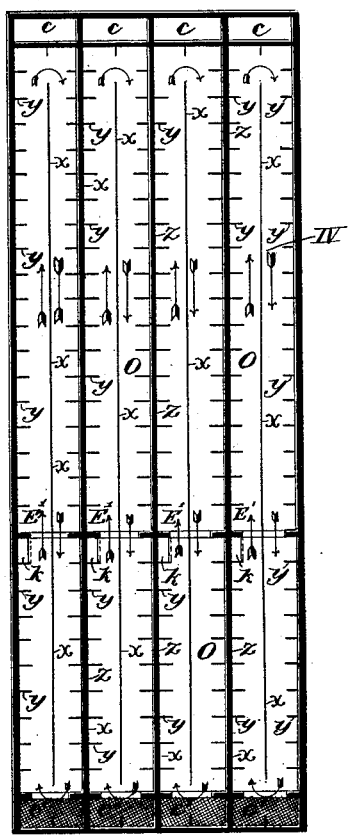
Figure 18:
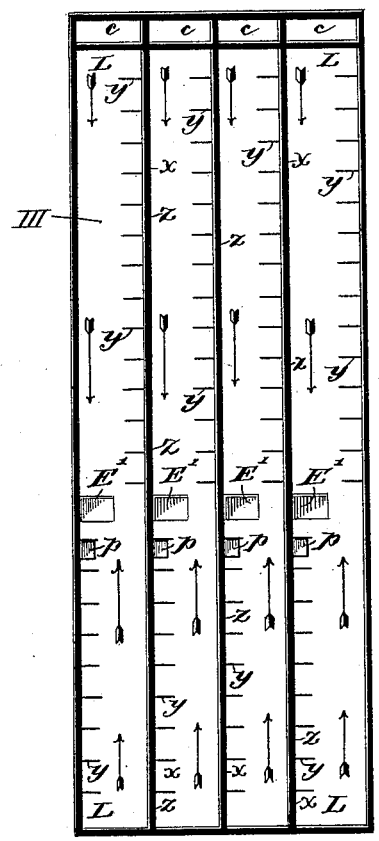
Figure 23:
Figure 24:
Figure 19:
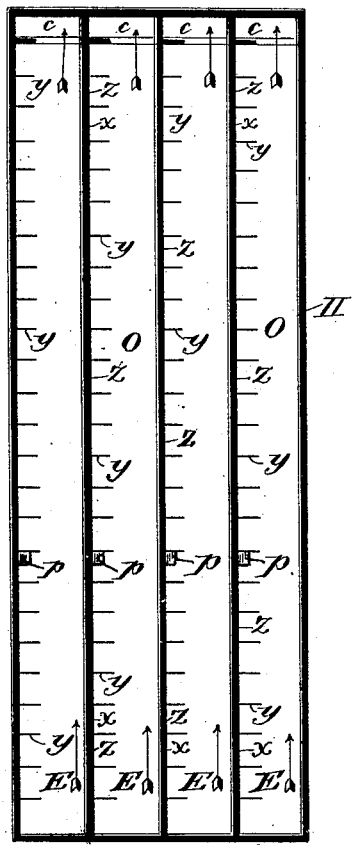
Figure 20:
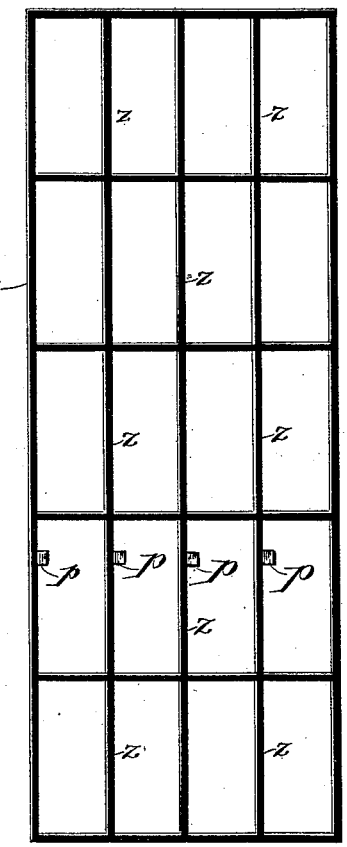
Figure 32:
Figure 33:
Figure 28:
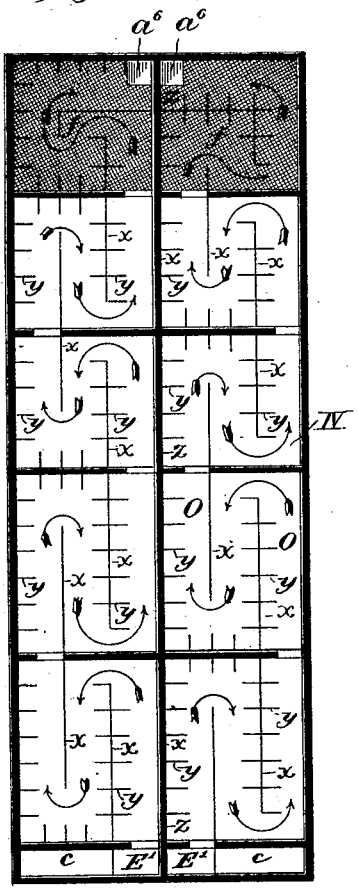
Figure 29:
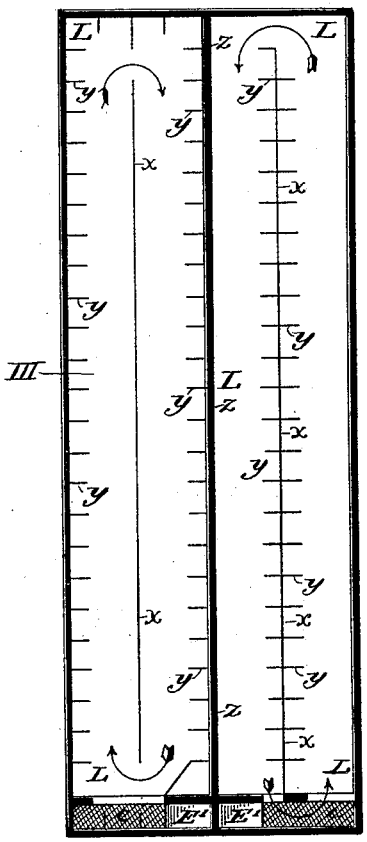
Figure 34:
Figure 35:
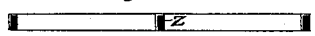
Figure 30:
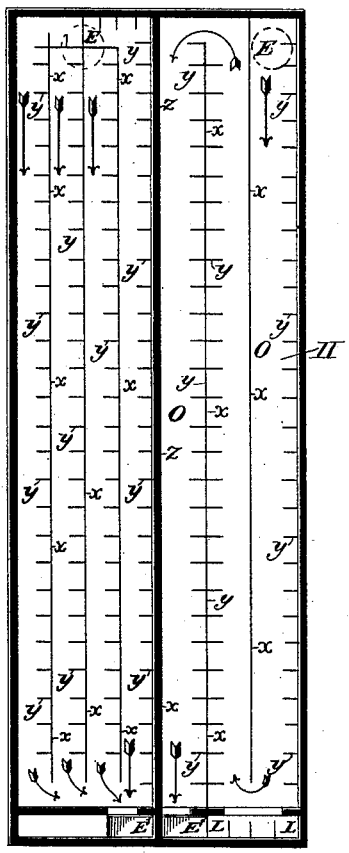
Figure 31:
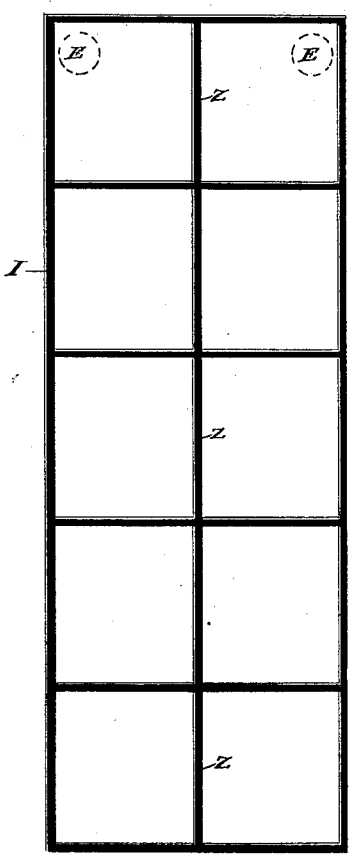
Figure 42:
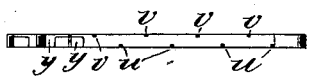

The stock to be sifted is introduced in the machine through the hopper E, Figs. 3, 4, and 9, and is moved and conveyed over the sieve-surface O of the top frame in the direction of the arrows by the cross-slats $y$, Figs. 9 to 13. The material which passes through the meshes of this first sieve falls onto the second sieve-surface O, Figs. 8 and 12, and moves along this in the direction of the arrows. Those particles of the stock which are too large to pass through the meshes of these two sieves fall at the end of the frames through the openings $c\ c'$ onto the bottom frame V, Fig. 5, and are respectively conveyed to the outlets $a\ a'$. The material which passes through the meshes of the second frame falls onto the linen bottom L, Figs. 7 and 11, and is conveyed on this to the opening E′, through which it falls onto the sieve-surface O of the frame IV, Figs. 6 and 10, on which the material again moves in the direction of the arrows and falls through the meshes in the different compartments of the bottom frame V, Fig. 5, according to the different sizes of the particles. On the bottom frame V the now sifted and sorted material or stock is conveyed to the outlets $a^3$ to $a^6$. The material which does not pass through the meshes of the frame IV is conveyed to the end of the frame and there falls through the wide meshes of the part $c^2$ onto the bottom frame V, whence it is conveyed to the outlet $a^2$.

The meshes of the sieves are prevented from getting stopped up by the brisk movement of the stock to be sifted; but, if desired, a small quantity of cleaning material may be added to the stock, so as to pass with the stock over the sieve-surfaces and keep the meshes open by friction and agitation. This cleaning material is passed on the frame IV through the inlet $p$, Figs. 7 and 8, while the spring-actuated flap $k$, Fig. 6, and the outlet $p'$, Fig. 5, serve for the removal of the cleaning material. The cleaning material may be removed and renewed during the process of sifting through the flap $k$.

Figure 6:
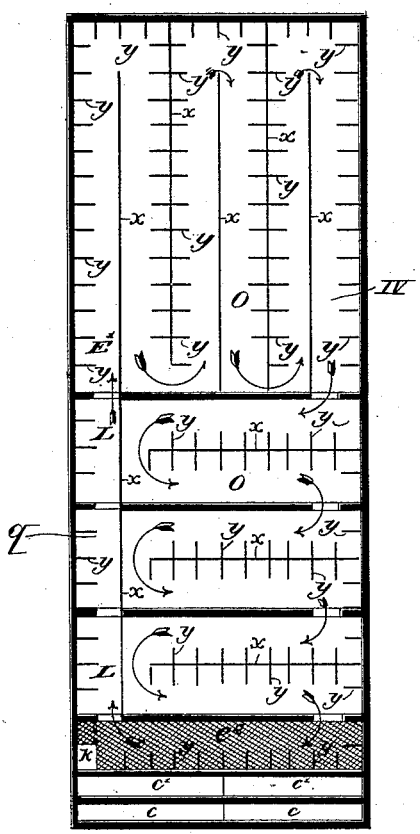
Figure 7:
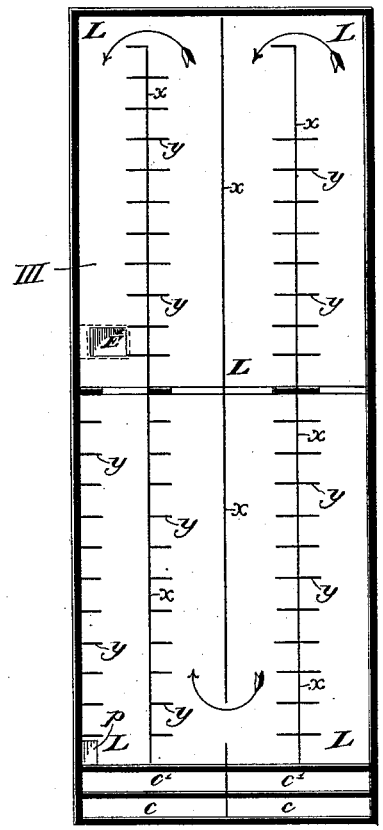
Figure 12:
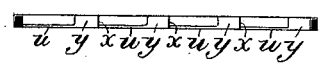
Figure 13:
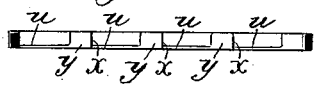
Figure 8:
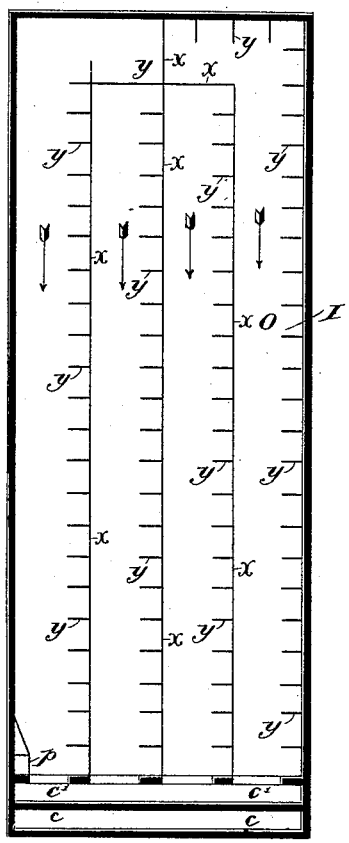

$q$, Fig. 6, represents the returning-channel for the cleaning material, in which the latter, after being separated from the sifted and sorted stock, is returned to the stock, continuously entering through the opening E′.

As cleaning material, corn—such as maize or wheat, bruised corn or groats, or other suitable material—is preferably used.

The bottom frame is (and in some cases the intermediate sieve-bottoms are) also provided with longitudinal and cross slats $x$ and $y$, forming different compartments, each of which is provided with a wide meshed part communicating with the outlets $a^3$ to $a^6$.

When the frames are being arranged in the principal frame or casing R in some of the compartments of the bottom frame, especially in those receiving very finely-divided stock, there may be introduced one or more wooden or hollow metal balls, which will circulate in the compartment and prevent the sifted material from adhering too much to the sides or the slats of the frame or compartment while being conveyed to the wide-meshed part by the cross-slats $y$.

By reason of the stock conveying or projecting slats the sieve-surfaces may be arranged horizontally or inclined, so that the stock may be caused to descend or ascend.

The rest of the drawings represent a series of variations and modifications of the machine just described constructed and arranged on the same principle, the modifications referring, principally, to different arrangements in the series of sieves consequent on the nature of the stock to be sifted.

The parts used in these modified arrangements, which also are used in the before-described machine, are indicated by the same letters of reference. It is therefore not necessary to fully describe these modified machines, but merely to point out the difference.

Figs. 14 to 24 represent a machine which is also provided with the arrangement for returning the cleaning material used on the sieve-surfaces and provided with compartments on the bottom frame in which cleaning bodies may circulate. Fig. 14 represents a longitudinal section on line A B of Fig. 16. Fig. 15 is a transverse section on line C D of Fig. 16, while Fig. 16 represents a plan of the principal frame or casing with the lowest bottom frame, the latter being in horizontal section. Figs. 17 to 20 represent horizontal sections of the superposed sieve, sieve-bottom, and filling-frames, while Figs. 21 to 24 represent cross-sections of these frames, respectively. The difference between this arrangement and the one represented in Figs. 3 to 13 is that the uppermost frame I, Figs. 20 and 24, has no sieve or conveying bottom-surface whatever, but merely acts as a filling-frame to fill the space in the principal frame or casing, so that the machine in this instance works with only one sieve in frame II, Figs. 19 and 23, and one sifting or sorting sieve IV, Figs. 17 and 21.

This machine is further provided with partitions $z$, which divide it into separate compartments. In this manner different qualities may be produced by using different-meshed sieves in the different compartments, or the same quality may be produced in all of them by using the same kind of sieve.

In the arrangement represented in Figs. 25 to 35 two sifting or sorting sieves are used. Fig. 25 represents a longitudinal section of Fig. 27 on line A B; Fig. 26, a transverse section on line C D of Fig. 27; and Fig. 27, a plan of the principal frame or casing with the lowest bottom frame, the latter in horizontal section. Figs. 28 to 31 represent horizontal sections of the different superposed frames, while Figs. 32 to 35 represent their respective cross-sections. The uppermost frame, Figs. 31 and 35, only serves as a filling-frame. The second frame II is the sifting or sorting sieve, and the material or particles passing through the meshes thereof and falling onto the intermediate bottom L of frame III are conveyed to the passages $cc$ and fall through these and the frame IV onto the bottom frame V, where it is conveyed to the outlet $a$. The stock remaining on, or that which does not pass through the meshes of the sieve II, is conveyed to the second sorting-sieve IV through the passage E'. This sieve IV is divided into different compartments having different kinds of sieves, so that the material or stock falls onto the bottom frame V, which has corresponding compartments for the different qualities. On the bottom frame V the sorted material is conveyed to the outlets $a'$ to $a^5$. The last compartment of the frame IV is provided with a sieve through which the coarsest part of the stock will pass, but which will retain the cleaning material, if such be used.

The outlet $a^6$ of the frame IV is connected with the feeding device of the machine, so that the cleaning material will return to the feeding device and be fed again to the sieve II mixed with fresh stock, thus being used over and over again.

Figure 43:
Figure 39:
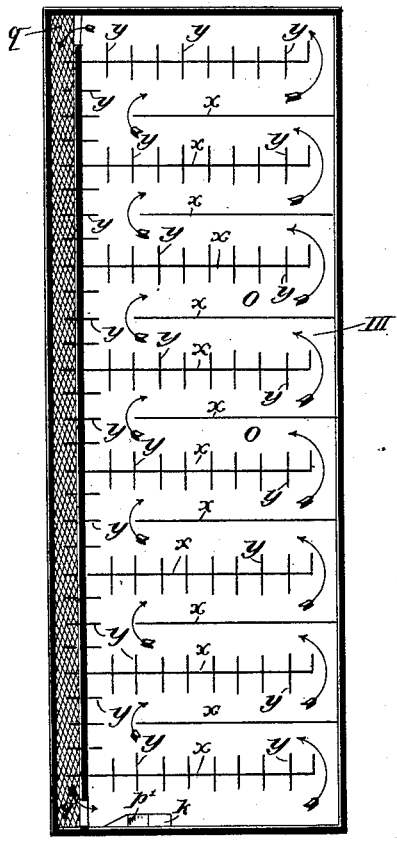
Figure 40:
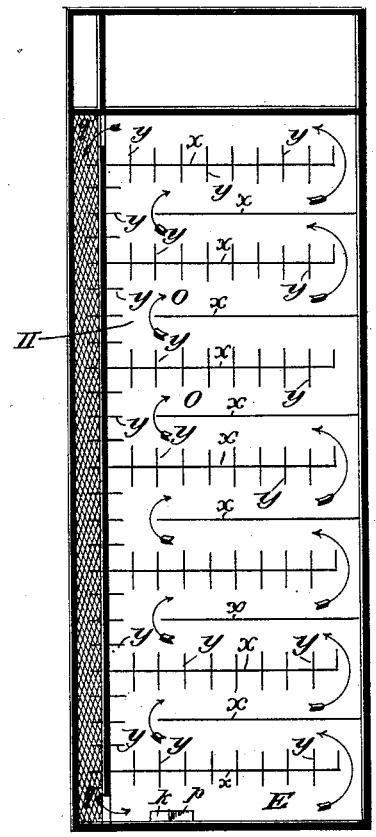
Figure 44:
Figure 41:
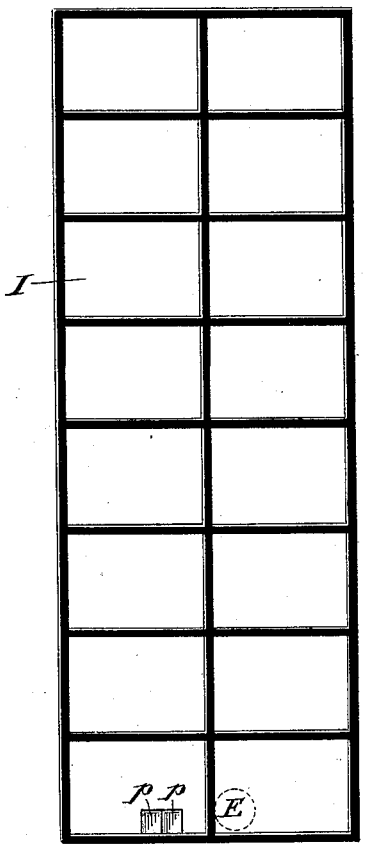
Figure 52:
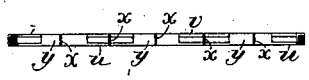
Figure 53:
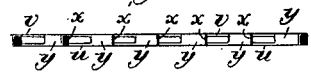
Figure 48:
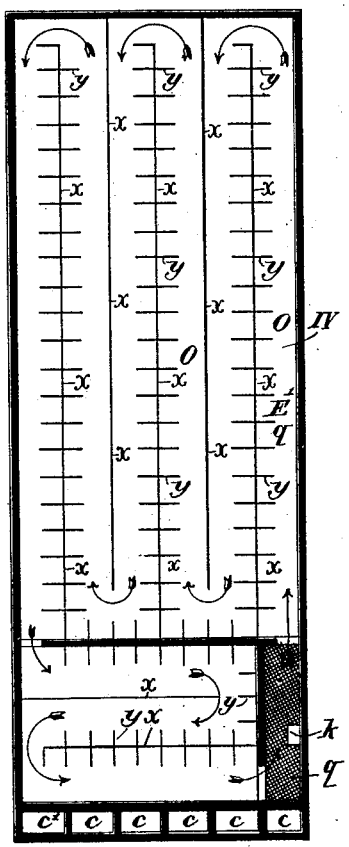
Figure 49:
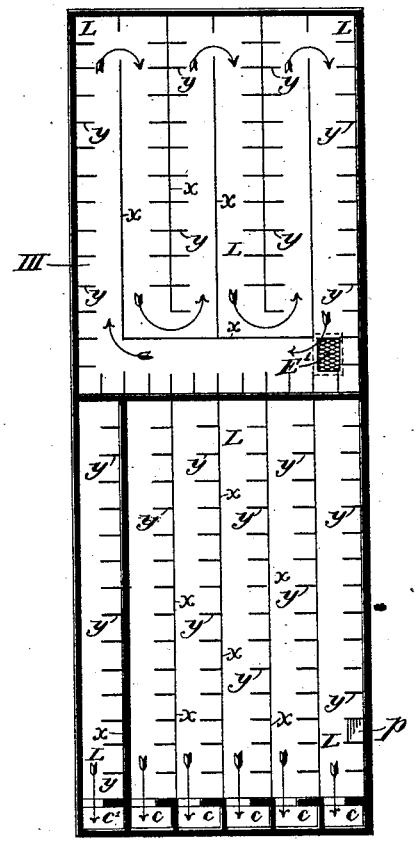
Figure 66:
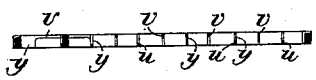
Figure 67:
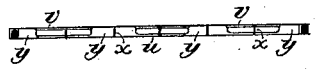
Figure 62:
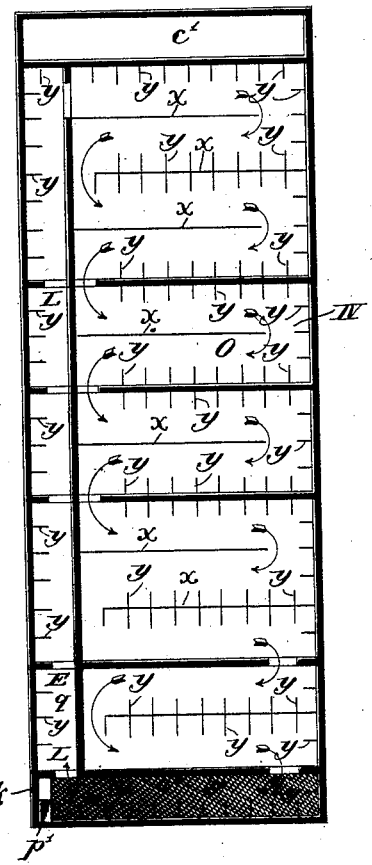
Figure 63:
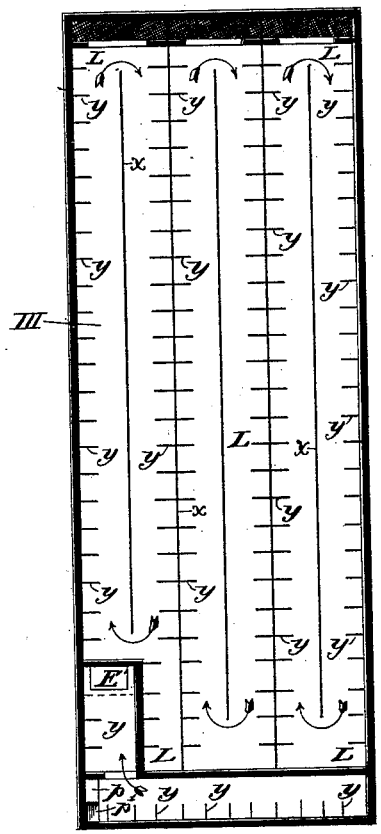
Figure 68:
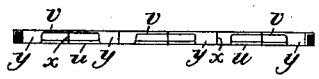
Figure 69:
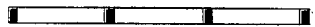
Figure 64:
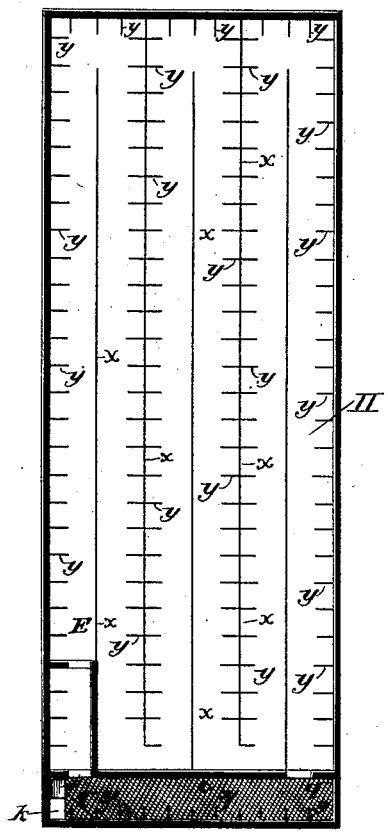
Figure 65:
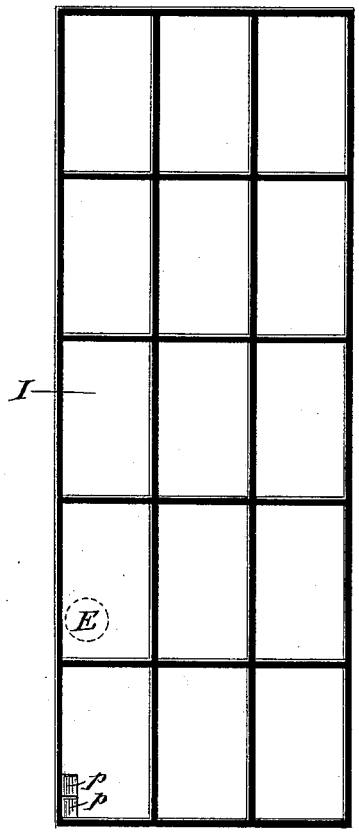

In the arrangement represented in Figs. 36 to 44 no intermediate conveyer-bottom is used. Fig. 36 represents a longitudinal section on line A B of Fig. 38; Fig. 37, a transverse section on line C D of Fig. 38; and Fig. 38, a plan of the principal frame or casing with the fourth or bottom frame, the latter in horizontal sections. Figs. 39 to 41 represent horizontal sections of the superposed frames, and 42 to 44 their respective cross-sections. The uppermost frame I is here also only a filling-frame. The next frame II, Figs. 40 and 43, is a sieve, and the frame III, Figs. 39 and 42, the sorting-sieve proper. The bottom frame can be seen in Fig. 38. In this apparatus the cleaning material, if such be used, circulates on both sieves the same as described in the first machine by means of return-channels arranged in the sieves themselves. A circulation of cleaning material on the bottom frame does not take place.

The machine represented in Figs. 45 to 58 works with two sieves, between which is arranged an intermediate conveyer-bottom. The first sieve is fitted half as a sieve having equal-sized meshes all over it and half as sorting-sieve, while the second sieve acts as sorting-sieve only, being divided into sections having different-sized meshes. This machine is provided with a special inlet-chamber, in which the stock is loosened, and with a special outlet-chamber for the suitable and convenient arrangement of the outlets. Fig. 45 represents a longitudinal section on line A B C D of Fig. 47; Fig. 46, a transverse section on line E F of Fig. 47; and Fig. 47, a plan of the principal frame or casing with the fifth or bottom frame, the latter in horizontal section. Figs. 48 to 51 represent horizontal sections of the superposed frames, while Figs. 52 to 55 are their respective cross-sections. Fig. 56 is a horizontal section of the inlet-chamber; Fig. 57, a horizontal section of the outlet-chamber, and Fig. 58 a vertical section of the latter on line G H of Fig. 57. The top frame I, Figs. 51 and 55, is again a filling-frame only. The second frame II, Figs. 50 and 54, is divided in two compartments, one of which has meshes of equal size and acts as a simple sieve, and the other acts as a sorting-sieve, being divided into sections having different-sized meshes. The part of the stock passing through the meshes of the half of sieve II, acting as a sieve, falls onto a corresponding part of the intermediate sieve-bottom III, Figs. 49 and 53, and falls from there through the outlet E' onto the second sorting-sieve IV, Figs. 48 and 52, where it is sorted. It falls then on the corresponding parts of the bottom V, whence it is conveyed to the outlets $a$. The part of the stock remaining on the bottom V is conveyed to the wide-meshed part $c^3$, through which it passes into the outlet-chamber, where it is conveyed to the outlet $a'$. The part of the stock remaining on the sieve part of frame II passes through $r$ to the sorting-sieve part thereof, where it is sifted according to quality, and falls then onto the corresponding parts of the bottom of frame III, and is conveyed thence through the passages $cc$ into the outlet-chamber and thence to the outlets $a^2$ to $a^5$. The rest of the stock remaining on frame II passes through the wide-meshed part $c'$ of the last channel to be conveyed to the outlet $a^6$, while the cleaning material, if such be used, does not pass through the wide-meshed part, but is returned to the inlet E' through the return-channel $q$ to be mixed again with fresh stock to be sifted.

The inlet-chamber represented in Fig. 56 serves to loosen the stock to be sifted by means of slats and to retain on its meshes any coarse substances which may have been introduced with the stock. The outlet-chamber, Figs. 57 and 58, serves to enable the passages $cc$ and $c'$, which lead to the outlets $a'$ to $a^6$ and are ordinarily arranged very near each other, to be spaced wider apart, so that by such divergence the sacks or receptacles for the reception of the sifted and sorted stock may be more conveniently placed.

The circulation of the cleaning material is the same as described before. The circulation of the wooden balls or equivalents is only the same on the bottom frame, while on the intermediate sieve-bottom these wooden balls or equivalents are only used on the part corresponding to the first sieve part of frame I I.

The arrangement represented in Figs. 59 to 69 is essentially the same as the one represented in Figs. 25 to 35, with the exception that in the present arrangement only one kind of stock is sifted, (the partition $z$ being for this purpose omitted,) and that the circulation of the cleaning material takes place on the sieves themselves instead of being effected by means of special return-channels. In this arrangement Fig. 59 represents a longitudinal section on line A B of Fig. 61; Fig. 60, a transverse section on line C D of Fig. 61; and Fig. 61, a plan of the principal frame or casing with the bottom frame V, the latter in horizontal section. Figs. 62 to Figs. 65 represent horizontal sections of the superposed frames, while Figs. 66 to 69 represent their respective cross-sections.

I do not restrict myself to the use of frames which are gyrated in strictly horizontal planes, as the device will work if the frames are slightly inclined in any direction; but the angle of inclination must of course be less than that at which the material would slide upon the bottoms of the moving frames; otherwise the action of the cross-slats $y$ would be neutralized.

What I claim is—

1. In a chop-grader, a frame having a gyrating motion and provided with guides in line with the desired main direction of travel of the material, and cross-slats $y$, extending part way across its surface between said guides, for causing the material to travel over the said surface, substantially as set forth.

2. In a chop-grader, a frame having a gyrating motion and provided with a sifting-surface of perforate material, the guide-slats $x$ upon its sifting-surface in line with the desired main direction of travel of the material, and cross-slats $y$, extending part way between said slats $x$, for causing the material to travel, substantially as set forth.

3. In a chop-grader, a frame having a gyrating motion and provided with guide-slats $x$ upon its surface in line with the desired direction of travel of the material, the cross-slats $y$, extending part way between said slats for causing the material to travel, and the ridges $u$ and bridges $v$, for turning over and evening the material, substantially as set forth.

4. In a chop-grader, the combination, with a frame-box provided with an inlet at its upper and outlets at its lower part, of rods pivotally supporting said box, a revoluble device, such as a crank, for imparting a continuous gyrating movement to said box, and a frame supported in said box and provided with a perforate sifting-surface and with guide-slats $x$ and cross-slats $y$, arranged on said surface, substantially as and for the purpose set forth.

5. In a chop-grader, the combination, with a gyrating frame-box, of a series of superposed frames in said box, said frames being provided with guide-slats $x$ and cross-slats $y$, for directing the material over their surfaces, and with openings through which the material may pass from the upper to the lower frames of the series, substantially as and for the purpose set forth.

6. In a shop-grader, the combination, with a gyrating frame-box, of a series of superposed frames in said box, some of said frames being provided with perforate sifting-surfaces of various fineness for sifting and grading the material and alternating with other frames having imperforate conveying-surfaces, all of the said frames being provided with guide-slats $x$ and cross-slats $y$, for causing the material to travel over their surfaces, substantially as and for the purpose set forth.

7. In a chop-grader, the combination, with a gyrating frame-box provided with an inlet at its upper and an outlet at its lower part, of a series of superposed sifting and grading frames in said box, each frame being provided with guide-slats $x$ and cross-slats $y$, for traveling the material, the inlet-chamber secured to the frame-box above said inlet and provided with cross-slats $y$, for breaking up and traveling the material, and the outlet-chamber secured below the box-outlets and also provided with cross-slats $y$ and with outlets spaced wider apart than the outlets of said box, substantially as and for the purpose set forth.

8. In a chop-grader, the combination, with a horizontally-gyrating rectangular frame-box, of a series of rectangular frames superposed one above the other in said box, said frames being provided with straight guide-slats $x$, arranged parallel to their sides and dividing their surfaces into separate channels, and the cross-slats extending part way across said channels for causing the material to travel over the surfaces of the frames, substantially as and for the purpose set forth.

9. In a chop-grader, the combination, with a horizontally-gyrating frame-box, of the series of frames I II III IV V, superposed one above the other in said box and provided with guide-slats $x$ and cross-slats $y$, for causing the material to travel, frames I, II, and IV being further provided with perforate sifting-surfaces and separate discharge-openings for unbolted material, frame III with an imperforate collecting-surface and the opening E', discharging into said frame IV, and the frame V with an imperforate surface and partitions for conveying the different grades of material to separate outlet-openings, substantially as set forth.

10. In a chop-grader, the combination, with a horizontally-gyrating frame-box, of the series of frames superposed one above the other in said box, some of said frames being provided with perforate sifting-surfaces of various fineness for sifting and grading the material, and these frames being further provided with openings for the introduction and discharge of granular cleaning substances adapted to mingle with the material being operated on, and others of the said frames being provided with imperforate conveying-surfaces, and all of the said frames in the series being provided with guide-slats $x$ and cross-slats $y$, for causing the material to travel over their surfaces, substantially as set forth.

In testimony whereof I have signed my name to this specification in the presence of two subscribing witnesses.

CARL HAGGENMACHER.

Witnesses:
GEORG DAUR,
MAURICE BLACK.